United States Patent
Yang (10) Patent No.: US 9,125,260 B1
(45) Date of Patent: Sep. 1, 2015

(54) CONTROL SYSTEM FOR FEEDBACK CONTROLLED LED DRIVING CIRCUIT

(71) Applicant: Chin-Hsin Yang, Taipei (TW)

(72) Inventor: Chin-Hsin Yang, Taipei (TW)

( * ) Notice: Subject to any disclaimer, the term of this patent is extended or adjusted under 35 U.S.C. 154(b) by 0 days.

(21) Appl. No.: 14/319,865

(22) Filed: Jun. 30, 2014

(30) Foreign Application Priority Data

Feb. 19, 2014 (TW) ............................. 103105561 A (51) Int. Cl.
*H05B 37/02* (2006.01)
*H05B 33/08* (2006.01)

(52) U.S. Cl.
CPC ........ *H05B 33/0809* (2013.01); *H05B 33/0884* (2013.01)

(58) Field of Classification Search
CPC ............................ H05B 33/0815; H05B 37/02
USPC ................ 315/200 R, 297, 307, 282
See application file for complete search history.

(56) References Cited

U.S. PATENT DOCUMENTS

| | | | |
|---|---|---|---|
| 2013/0249440 A1* | 9/2013 | Doshi et al. | 315/309 |
| 2013/0313974 A1* | 11/2013 | Fan et al. | 315/127 |

* cited by examiner

*Primary Examiner* — Daniel D Chang
(74) *Attorney, Agent, or Firm* — Wang Law Firm, Inc.; Li K. Wang; Stephen Hsu (57) ABSTRACT

A control system for a feedback controlled LED driving circuit, which includes a valley detect regulator unit and a control and feedback unit. The valley detect regulator unit detects a sine-like DC voltage input by a rectification unit, and stores the electric energy in the storage capacitor when the input voltage is lower than a preset valley voltage. The stored electric energy converted into the system required voltage by a system power supply unit. The control and feedback unit electrically connect to the feedback controlled LED driving circuit, providing PFC, step dimming or color temperature adjustment for driving the LED light-emitting element and detecting a feedback signal of the LED driver circuit for controlling an output current of the LED driver circuit or providing protective measures.

4 Claims, 6 Drawing Sheets

CONTROL SYSTEM FOR FEEDBACK CONTROLLED LED DRIVING CIRCUIT

CROSS-REFERENCE TO RELATED APPLICATION

This application claims the benefit of Taiwan Patent Application No. 103105561, filed on Feb. 19, 2014, in the Taiwan Intellectual Property Office, the disclosure of which is incorporated herein its entirety by reference.

BACKGROUND OF THE INVENTION

1. Field of the Invention

The present invention relates to the field of a control system for the light emitting diode (LED) driving circuit, in particular with respect to a control system for the feedback controlled LED driving circuit.

2. Description of the Related Art

Recently, as the unceasing improvement in DC conversion driver technique used in light emitting diode (LED), such as various designs of linear electric power driver and switching power driver, and switching power driver comprises isolated, non-isolated and various derivatives of topology configurations of which aims at providing acceptable technical solutions to consumers in the fields of power factor, efficiency, power supply controller, light source flicker, dimming, safety regulation and cost and so on.

In terms of conventional LED driver circuit, the main problem of power supply controller lies in that it is self-powered which leads to that a transformer has to coil additional wires, slower start speed and false start resulted from current leakage of power switch may be also included. And the means of non-self-powered uses line voltage to directly reduce voltage for supplying power which wastes more electric power as well as degrades the entire conversion efficiency. In addition, regarding the conventional power factor correction (PFC), it mostly uses the waveform of AC voltage derived from analog conversion to correct the reference voltage, but the means is incapable of optimizing the power factor and current harmonics based on the adjusted current waveform adapted by various driving methods, and it also has to add extra pin to detect waveform and therefore raises the cost of controller.

SUMMARY OF THE INVENTION

In view of the aforementioned technical shortcomings, the purpose of the present invention is to provide a control system for a feedback controlled LED driving circuit to solve the known problem concerning electric energy conversion efficiency and LED driver method.

According to the purpose of the present invention, it may provide a control system for a feedback controlled LED driving circuit, the feedback controlled LED driving circuit being powered by a full-wave rectification unit rectifying an AC power signal to a sine-like DC power signal. The control system comprising: a valley detecting regulator unit electrically connected to the rectification unit, the valley detecting regulator unit receiving and analyzing the sine-like DC power signal; a power storage capacitor electrically connected to the valley detecting regulator, the power storage capacitor being charged by the valley detecting regulator unit with the sine-like DC power signal while the valley detecting regulator unit determines the voltage level of the sine-like DC power signal to be lower than a preset valley voltage; a system power supply unit electrically connected to the power storage capacitor, the system power supply unit receiving electric energy from the power storage capacitor and converting the electric energy into system required voltages for the control system; and a control and feedback unit electrically connected to the feedback controlled LED driving circuit, the control and feedback unit receiving a feedback signal from the feedback controlled LED driving circuit and accordingly generating a control signal to control an output current of the feedback controlled LED driving circuit for driving an LED element or to provide a protective measure thereto.

Preferably, the feedback controlled LED driving circuit may further comprise an anti-creep unit disposed in a power switch directing a leakage current occurred in an indicator of the power switch to a dummy load to avoid the leakage current rising a voltage to cause false start of the feedback controlled LED driving circuit.

Preferably, the control system for a feedback controlled LED driving circuit may be feedback powered via a secondary side of a transformer or a self-powered inductor when is turned on.

Preferably, the control and feedback unit also connects to the valley detect regulator unit and receives a valley synchronous signal from the valley detect regulator unit, the valley synchronous signal generates in every valley of the sine-like DC power signal and starts a digital waveform for power factor correction, the control and feedback unit controls the output current of the feedback controlled LED driving circuit depending on the digital waveform.

Preferably, the control system for a feedback controlled LED driving circuit may further comprise a digital numerical table connecting to the control and feedback unit, the digital numerical table recording a plurality of optimal power factor values and the plurality of optimal power factor values being output one by one when the control and feedback unit being triggered by the synchronous signal.

Preferably, the control system for a feedback controlled LED driving circuit may further comprise a dynamic reference voltage generating unit being electrically connected to the control and feedback unit, and the dynamic reference voltage generating unit converting the optimal power factor value to generate a convertible voltage value through digital/analog conversion (DAC) so as to control the output current of the feedback controlled LED driving circuit.

Preferably, the LED driver circuit may comprise isolated, non-isolated, and various derivatives of circuit topology.

According to the aforementioned description, a control system for a feedback controlled LED driving circuit of the present invention may have one or more advantages as follows:

(1) The control system for a feedback controlled LED driving circuit may derive electric energy which is smaller than a preset valley voltage threshold value, not a full band one to lower the energy consumption.

(2) The control system for a feedback controlled LED driving circuit may correct a LED driver circuit by using a PFC unit's value so as to promote conversion efficiency of the system.

In order to enable the examiner further understanding the effectiveness which the technical feature of the present invention makes, please refer to the following preferred embodiments along with the detailed description thereof.

DETAILED DESCRIPTION OF THE PREFERRED EMBODIMENTS

Hereinafter, embodiments of the present invention will be described in detail with reference to the accompanying drawings so that those skilled in the art to which the present invention pertains can realize the present invention. As those skilled in the art would realize, the described embodiments may be modified in various different ways, all without departing from the spirit or scope of the present invention.

Figure 1:
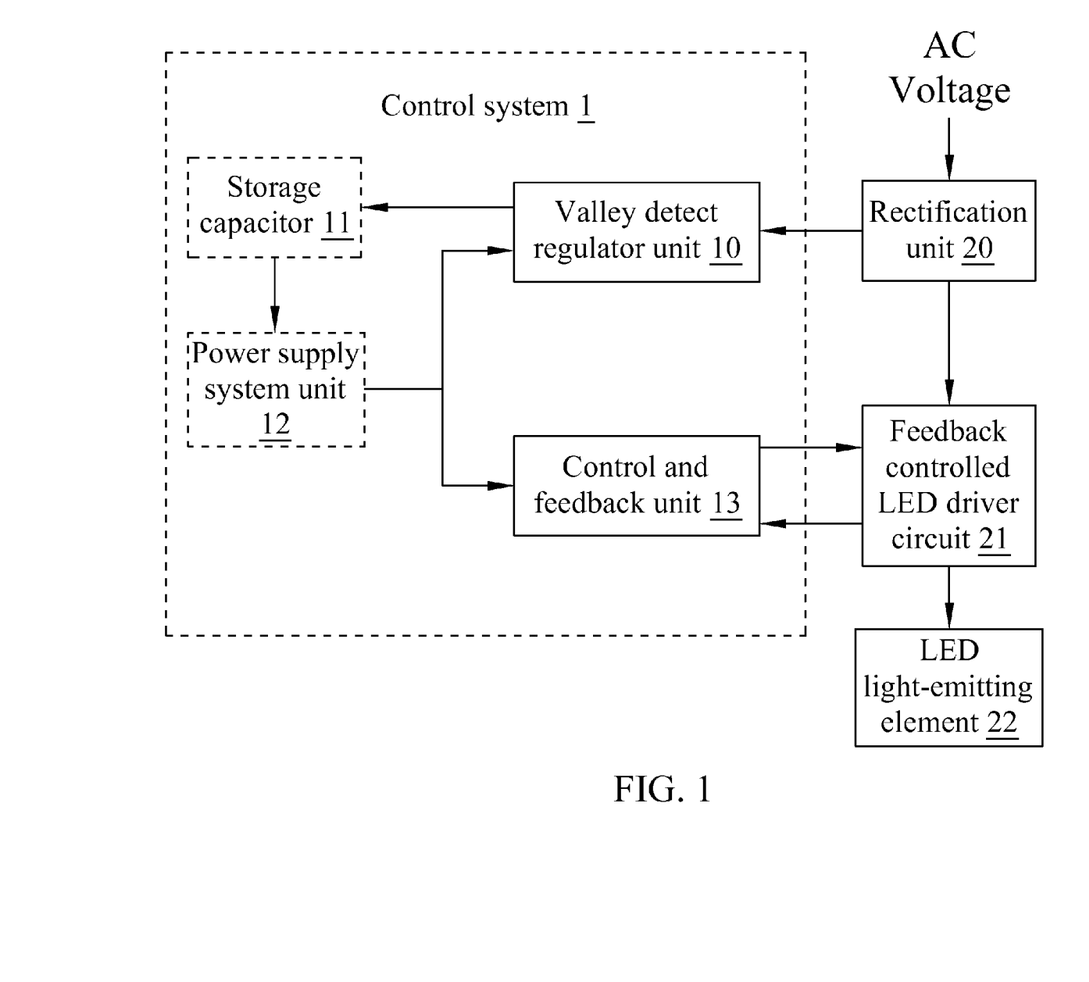
FIG. 1 is a schematic diagram of the first embodiment of a control system for a feedback controlled LED driving circuit of the present invention.

With reference to FIG. 1, which is a schematic diagram of the first embodiment of a control system for a feedback controlled LED driving circuit of the present invention. As the figure shows, a control system 1 of the present invention comprises a valley detect regulator unit 10, a storage capacitor 11, a power supply system 12 and a control and feedback unit 13. Wherein, the valley detect regulator unit 10 is electrically coupled to a rectification unit 20, and the rectification unit 20 receives an outer AC line voltage and rectifies it to a sine-like DC voltage; the valley detect regulator unit 10 receives an input voltage which is compared with a predefined valley voltage threshold value and when the input voltage is lower than the valley voltage threshold value, charging the connected storage capacitor 11, and the storage capacitor 11 is thereby connected to the power supply system unit 12 to convert the stored electric energy into various system required voltages for serving the valley detect regulator unit 10 or the control and feedback unit 13. Moreover, the control and feedback unit 13 is electrically coupled to a feedback controlled LED driving circuit 21, and the feedback controlled LED driving circuit 21 receives a voltage output from the rectification unit 20, and provides PFC or step dimming for driving a LED light-emitting element 22 emitting light; in the meanwhile, the control and feedback unit 13 also detects various feedback signals of the feedback controlled LED driving circuit 21 for controlling the output current of the LED driver circuit and provides protective measures, for example over voltage protect or over current protect. The feedback controlled LED driving circuit 21 mentioned here is designed as isolated, non-isolated and various derivatives of topology. The LED light-emitting element 22 which is electrically connected to the feedback controlled LED driving circuit 21 may include a plurality of LEDs comprising different voltage currents in series and parallel.

In the operating process of the valley synchronous regulator of the control system 1, the valley detect regulator unit 10 compares the voltage threshold value with the voltage level. For example, the comparisons of absolute magnitude or relative proportion of numerical value. It is worth to mention that the following embodiment adapts the comparison of numerical value in order to describe and explain easily, but it shall not be subject to this restriction. When the valley detect regulator unit 10 determines that the voltage level is lower than the valley voltage threshold value, the valley detect regulator unit 10 enables the input line voltage charging to the storage capacitor 11 and converting the electric energy stored in the storage capacitor 11 into the system required various power voltages by the power supply system unit 12. Moreover, when the valley detect regulator unit 10 determines that the voltage level is higher than the valley voltage threshold value or the capacitor voltage is higher than the design voltage, the valley detect regulator unit 10 disables the input line voltage for charging the capacitor to avoid wasting the electric energy while supplying power in high-voltage phase. And then, the power supply system unit 12 supplies the necessary electric energy to the system from the capacitor.

In addition, the rectification unit 20 can be a combination of bridge rectifier and diode, and the valley detect regulator unit 10 is used to decide the valley voltage level and is composed of several voltage dividing resistors, comparators and reference voltages. Wherein, the valley voltage level and charging current is adjusted according to the acceptable power consumption while the system is supplying power.

Furthermore, the valley detect regulator unit 10 is composed of a plurality of resistors, a first transistor, a second transistor and a comparator, and when the first transistor being turned on and the second transistor being turned off, the voltage divisions of the plurality of the resistors and the comparison voltage of the comparator set the valley voltage threshold value. For example, it may comprise the first transistor, the second transistor and zener diode. According to the circuit logic, when the voltage level is higher than the valley voltage threshold value, the first transistor is turned on, the second transistor is turned off, and the zener diode is turned off so that the electricity storage element is not charged; when the voltage level is lower than the voltage threshold value, the first transistor is turned off, the second transistor is turned on and the zener diode is turned on so that the electricity storage element may be charged. When the comparator detects that the capacitor charges to a preset voltage and the line voltage is higher than the valley voltage threshold value, the valley detection and charge logic therefore send a control signal to cutoff the line voltage charging to the capacitor. Wherein, the capacitor is charged to the preset voltage which is ranged substantially between 8V and 30V, and the first and the second transistors can be metal oxide semiconductor field effect transistor (CMOS FET). Here only describes the logic relationship between each electronic component and more detailed circuit connection will be explained in FIG. 4.

Figure 2:
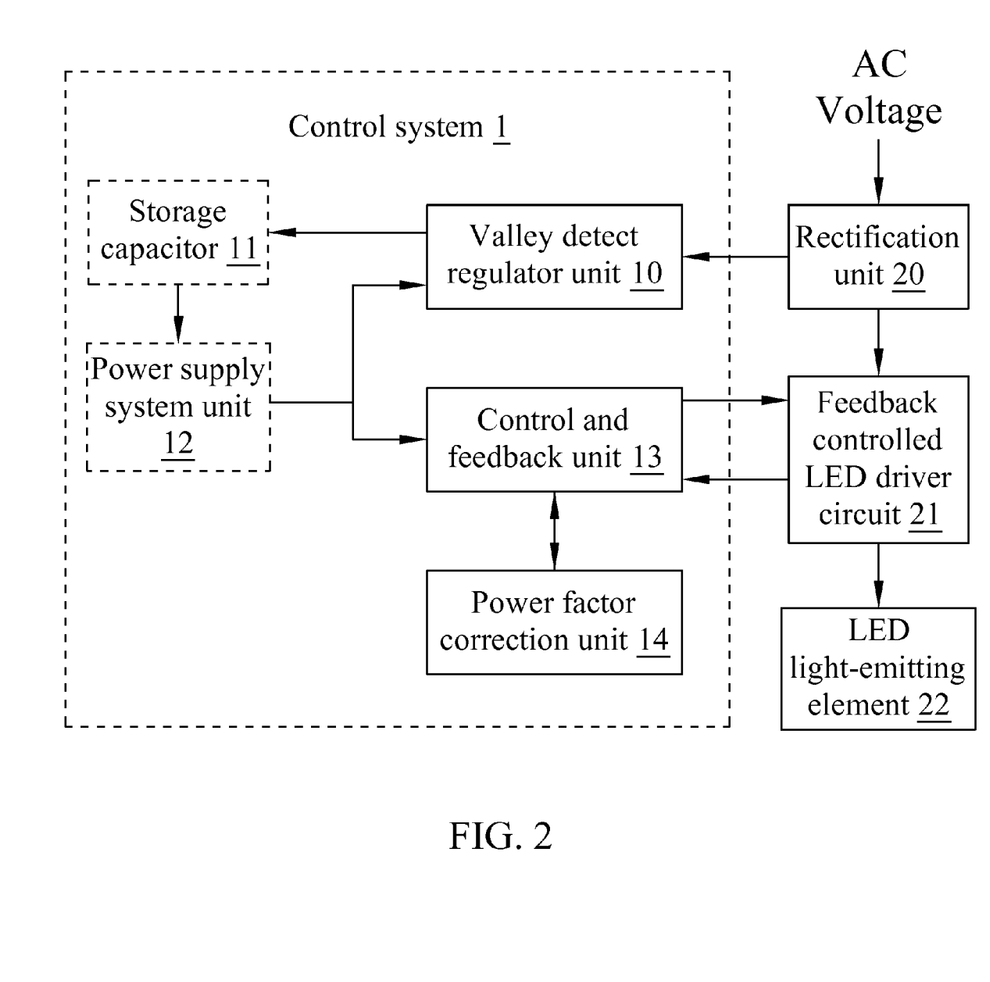
FIG. 2 is a schematic diagram of the second embodiment of a control system for a feedback controlled LED driving circuit of the present invention.

Please with reference to FIG. 2, it is a schematic diagram of the second embodiment of a control system for a feedback controlled LED driving circuit of the present invention. As the figure shows, connections between the same or the similar components in the second and the first embodiments indicate the same operation, and unnecessary details are no longer given. However, the difference between the second and the first embodiments depends on that the control system 1 of the second embodiment further comprises a power factor correction unit 14, and the power factor correction unit 14 is electrically connected to the control and feedback unit 13, and via a feedback signal provided by the feedback controlled LED driving circuit 21, the control and feedback 13 makes the output current correction based on the corrected numerical value corresponding to the feedback signal provided by the power factor correction unit 14 to control the output current of the LED light-emitting element 22 and optimizes the current waveform and phase of the AC line voltage.

Figure 3:
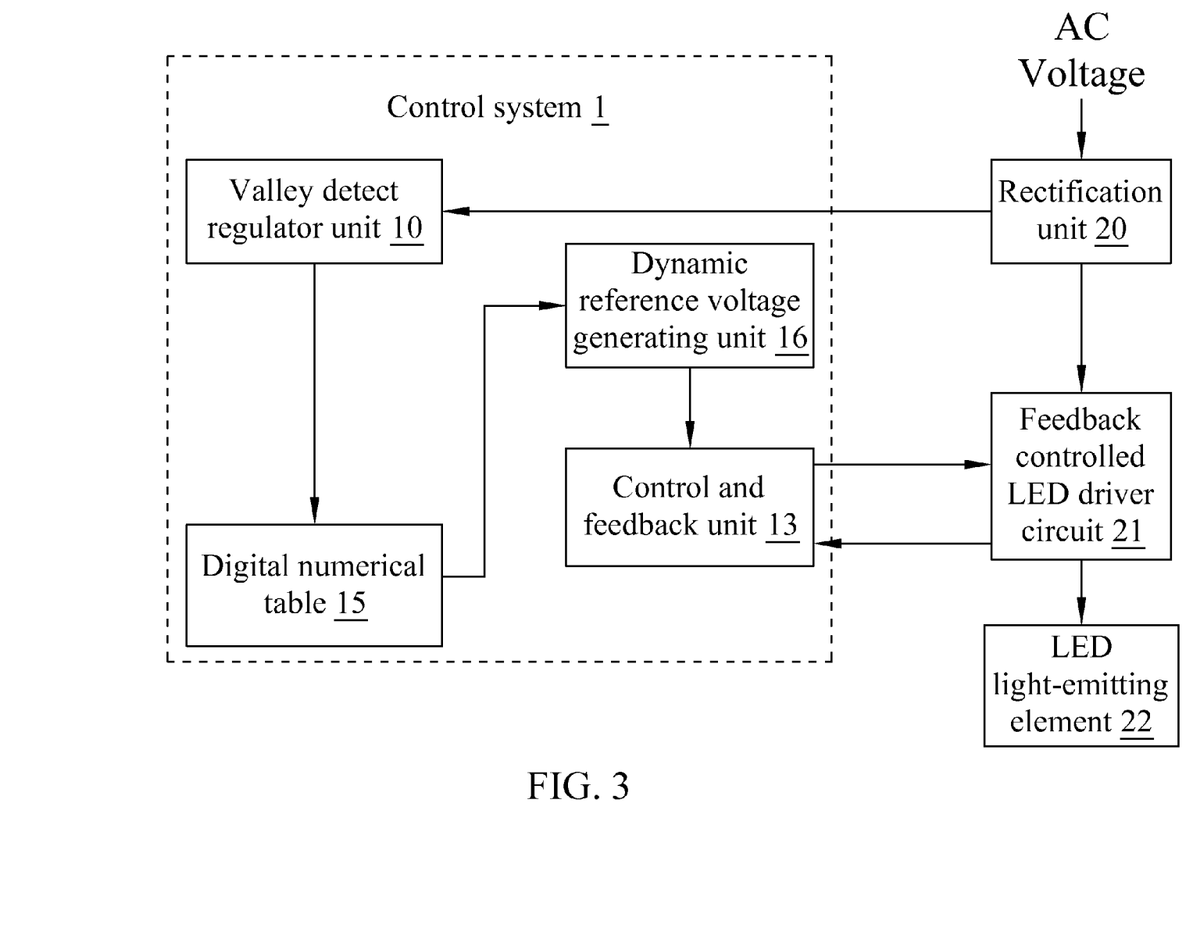
FIG. 3 is a schematic diagram of the third embodiment of a control system for a feedback controlled LED driving circuit of the present invention.

Please with reference to FIG. 3, it is a schematic diagram of the third embodiment of a control system for a feedback controlled LED driving circuit of the present invention. As the figure shows, connections between the same or the similar components in the third and the first embodiments indicate the same operation, and unnecessary details are no longer given. However, the difference between the third and the first embodiments depends on that the control system 1 of the third embodiment further comprises a digital numerical table 15 and a dynamic reference voltage generating unit 16. The valley detect regulator unit 10 generates a valley synchronous signal in every valley of the sine-like DC power signal, and finds out the optimal valley synchronous starting point to align the current phase of the LED light-emitting element 22 with the AC line current phase. The digital numerical table 15 is connected to the control and feedback unit 13. The digital numerical table 15 recording the numerical values which optimize the power factor, and when the valley synchronous signal is triggered, the digital numerical table 15 is output from a starting position one by one. the dynamic reference voltage generating unit 16 is connected to the digital numerical table 15 and the dynamic reference voltage generating unit 16 converts the input numerical value to generate a convertible voltage value through digital/analog conversion (DAC); the control and feedback unit 13 is electrically connected to the dynamic reference voltage generating unit 16, and the control and feedback unit 13 drives the feedback controlled LED driving circuit 21 of various Topology.

It is noticeable that signal which the valley detect regulator unit 10 provides for the control and feedback unit 13 at least comprises a valley synchronous triggering signal. The valley detect regulator unit 10 can derive the valley synchronous triggering signal by dividing the length of the waveband time by 2 when the measuring line voltage waveform is lower than length of waveband time of the voltage threshold value, and the digital numerical table 15 can thereby output the contained numerical table from the starting position one by one based on each triggering signal.

Figure 4:
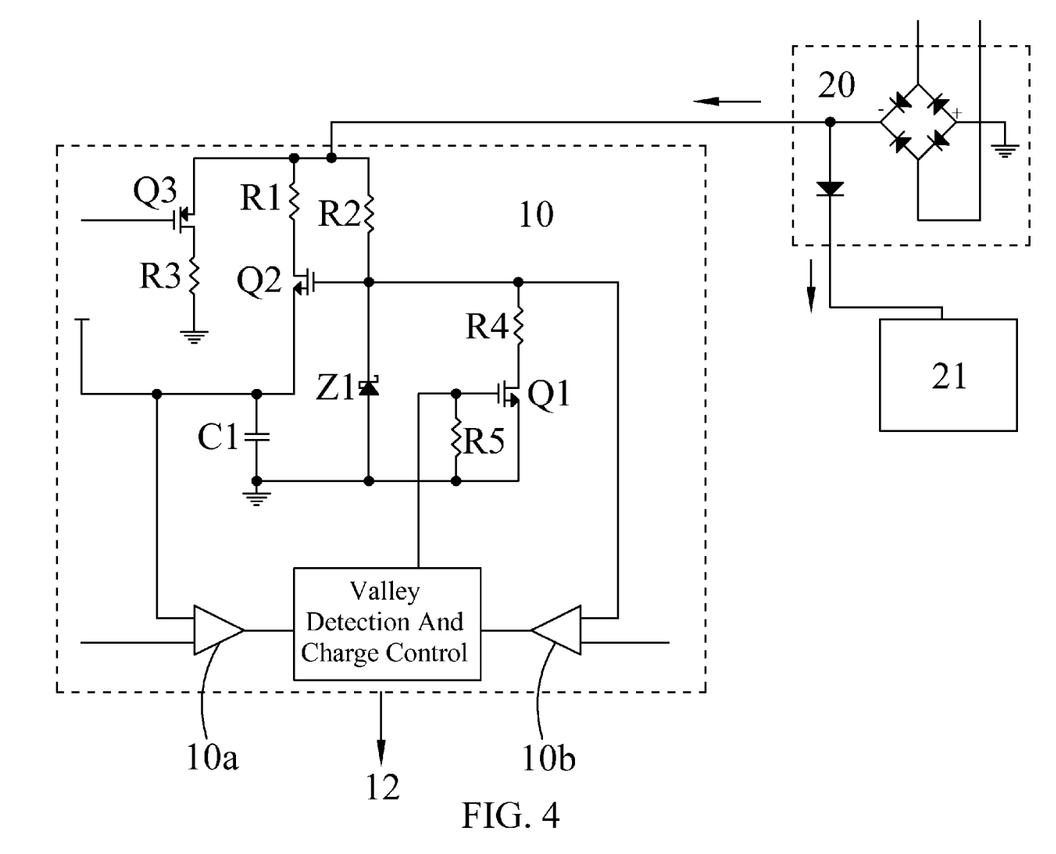
FIG. 4 is a schematic diagram of the circuit of a valley detect regulator unit of the present invention.
Figure 5:
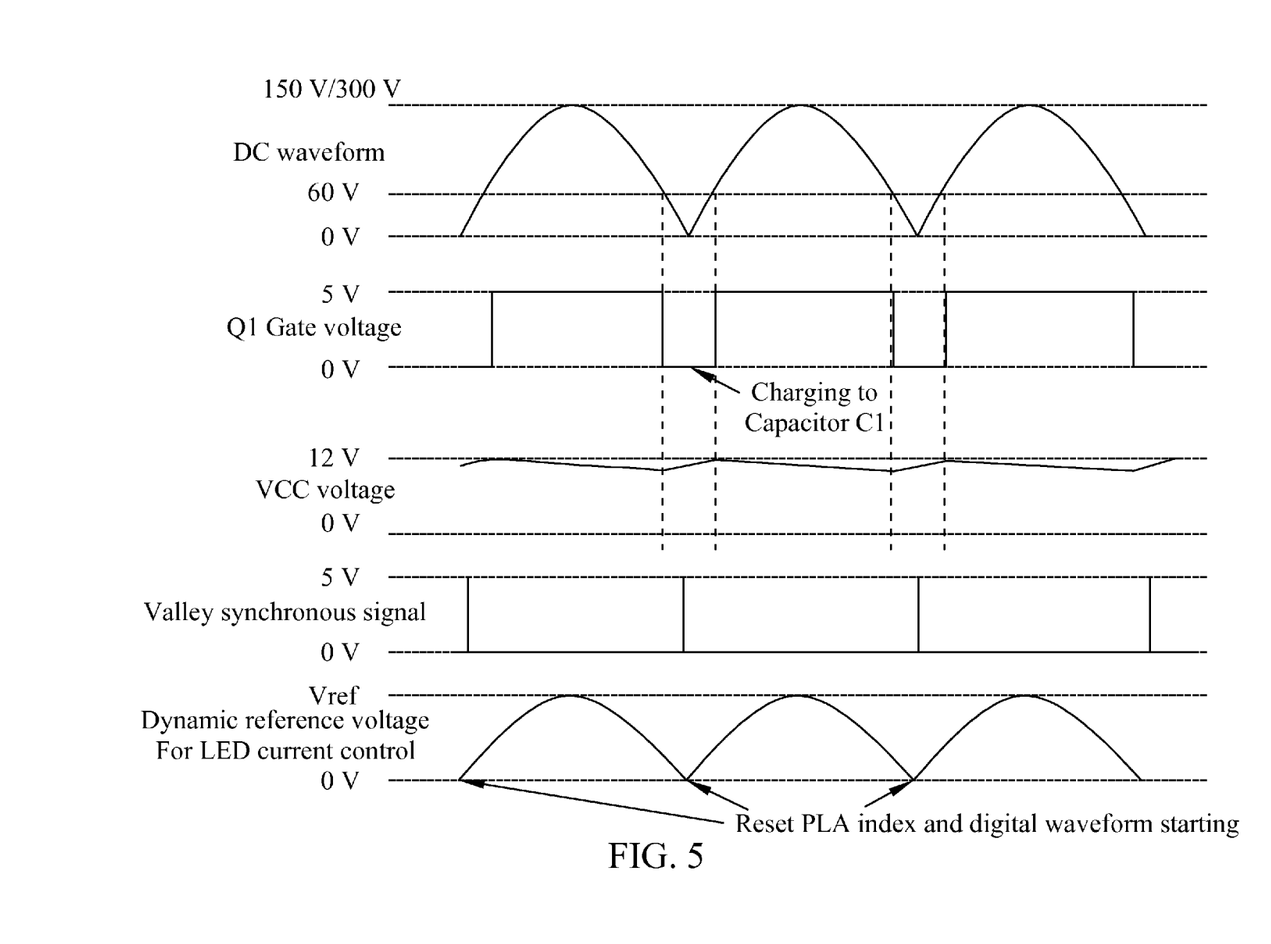
FIG. 5 is a schematic diagram of waveform of a valley detect regulator unit of the present invention.

Please with reference to FIGS. 4 and 5, they are a schematic diagram of the circuit of a valley detect regulator unit of the present invention and a schematic diagram of waveform of a valley detect regulator unit of the present invention, respectively. As FIG. 4 shows, the valley detect regulator unit 10 comprises a first transistor Q1, a second transistor Q2, a third transistor Q3, a charge capacitor C1, a zener diode Z1 and resistors R1-R5. The rectification unit 20 receives external AC line voltage power, such as AC power, and the external AC line voltage power is rectified and output to the valley detect regulator unit 10 and the LED driver circuit 21. The valley detect regulator unit 10 decides the valley voltage level, and when the line voltage is higher than the valley voltage value, the first transistor Q1 is turned on, and the second transistor Q2 and the zener diode Z1 are turned off which is decided by the resistors R2 and R4 and a 1.2V comparator 10a and the valley threshold voltage is (1+R2/R4)*1.2V. At this time, the second transistor Q2 is turned off so that the charge capacitor C1 is in discharging power state; when the line voltage is lower than the valley voltage, the first transistor Q1 is turned off, and the second transistor Q2 and the zener diode Z1 are turned on so that the charge capacitor C1 is in charging power state, voltage of the charge capacitor C1 keeps rising and compares with another 12V comparator 10b. The charging of charge capacitor C1 cuts off when the necessary voltage 12V is satisfied and keeps waiting for next valley to complete a charge and discharge period to the charge capacitor C1. Besides, the power supply means can be used to avoid the false start of the system when a week current supplied by the leakage current occurred in an indicator of the power switch. When the system is not turned on, the control signal to the gate of the third transistor Q3 is in low voltage, so that the third transistor Q3 is turned on and the leakage current is bypassed to ground via a dummy load resistor R3, and the voltage is unable to rise so that the system is free from the false start. When the power switch turned on and the dummy load cannot hold the voltage so that the voltage rises to start voltage of the system, the control signal of gate of the third transistor Q3 is set as high voltage to turn off the third transistor Q3, such that the dummy load is not conducted and the system is thereby in normal operation and can supply power.

As FIG. 5 shows, AC waveform is rectified to full waveband DC by the rectification unit 20 and the valley voltage threshold value is set as about 60V by the resistors R2 and R4 and the comparison voltage 1.2V, and when the sine-like DC waveform is higher than the waveband of the voltage threshold value 60V, the gate voltage of the first transistor Q1 raises to 5V to turn on the first transistor Q1 while the capacitor C1 is not charged, the capacitor C1 discharges to provide the electric energy to the system required voltage by the system power supply unit and the voltage measured by VCC is therefore decreased. When the sine-like DC waveform is smaller than the waveband of the voltage threshold value 60V, the gate voltage of the first transistor Q1 declines to 0V and the second transistor Q2 is thereby turned on, in the meanwhile, the capacitor C1 will be charged, and the voltage measured by VCC will arise. The charging will stop when the voltage measured by VCC is charged to the comparison voltage 12V or the sine-like DC waveform is higher than valley voltage. The full period requirement energy is supplied by the AC electric energy when the waveform is lower than the voltage threshold value 60V. At the same time, the valley detect regulator unit 10 generates a valley synchronous signal in every valley of the sine-like DC waveform and sets up as the starting point of the digital waveform. The dynamic reference voltage generating unit converts the numerical value in the digital numerical table to generate a reference voltage and control the driving current of the feedback controlled LED driving circuit.

Figure 6:
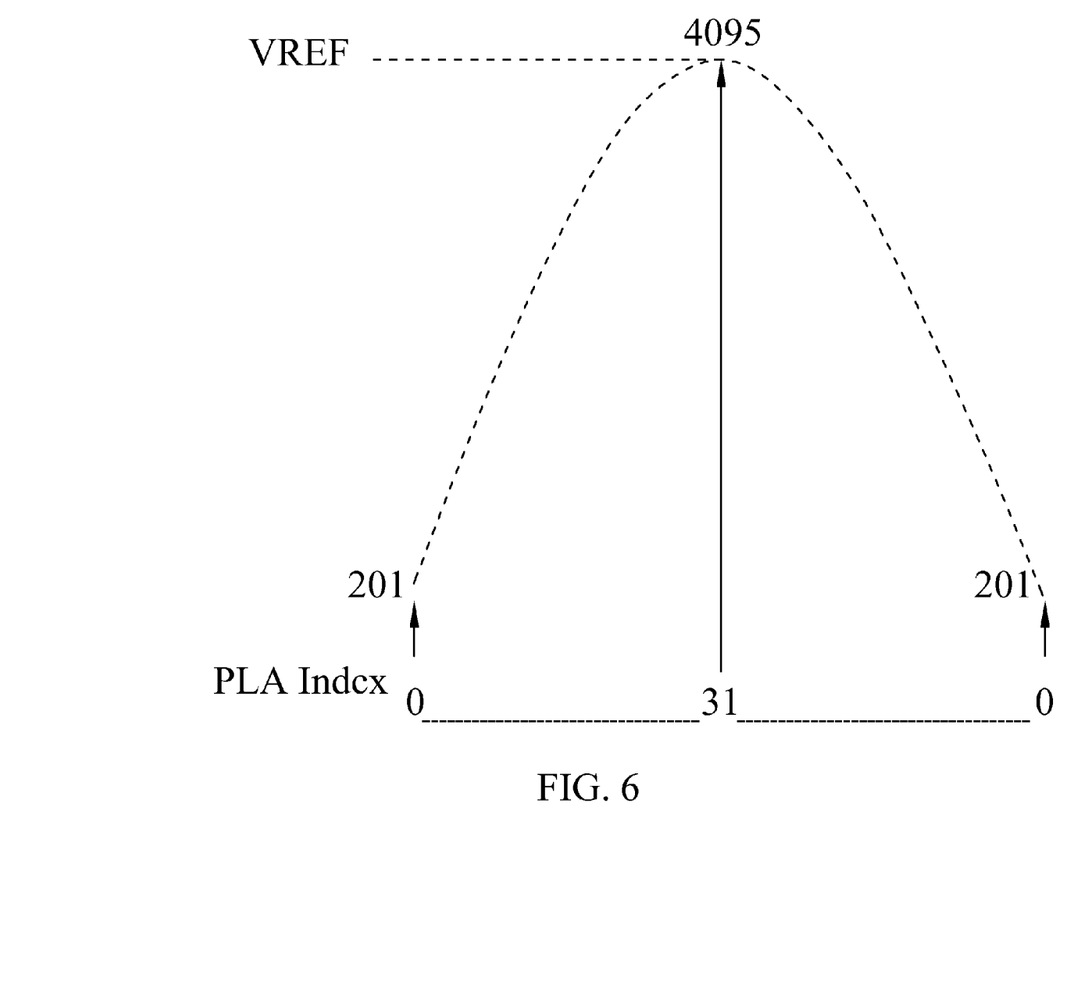
FIG. 6 is a schematic diagram of waveform of a power factor correction unit of the present invention.

As FIG. 6 shows, it is a schematic diagram of waveform of a power factor correction unit of the present invention. The power factor correction unit comprises programmable logic array (PLA) inside which records the numerical value that can be corrected by the power factor, and the PLA index and the corresponding digital PFC value table is shown as follows. Under the circumstance of normal isolated or boost LED driving topology, it can record discrete series of sine waveform, and whenever the valley detect regulator unit 10 inputs the valley synchronous signal, the PLA index in the digital numerical table 15 will be counted from 0 and then input the corresponding numerical value to the dynamic reference voltage generating unit 16 one by one and the PLA index counts down to 0 to complete a sine period by 180 degree. And as FIG. 6 shows, the numerical value of next period is generated when the valley synchronous signal is triggered. The number of PLA index and the bit number of PFC values can be changed depending on design cost and power-factor performance.

TABLE 1

| PLA Index | Digital PFC Value (12 bits) | PLA Index | Digital PFC Value (12 bits) |
|---|---|---|---|
| 0 | 201 | 16 | 3035 |
| 1 | 402 | 17 | 3166 |
| 2 | 601 | 18 | 3290 |
| 3 | 799 | 19 | 3406 |
| 4 | 995 | 20 | 3513 |
| 5 | 1189 | 21 | 3613 |
| 6 | 1380 | 22 | 3703 |

TABLE 1-continued

| PLA Index | Digital PFC Value (12 bits) | PLA Index | Digital PFC Value (12 bits) |
| --- | --- | --- | --- |
| 7 | 1568 | 23 | 3784 |
| 8 | 1751 | 24 | 3857 |
| 9 | 1931 | 25 | 3920 |
| 10 | 2106 | 26 | 3974 |
| 11 | 2276 | 27 | 4018 |
| 12 | 2440 | 28 | 4052 |
| 13 | 2599 | 29 | 4077 |
| 14 | 2751 | 30 | 4090 |
| 15 | 2896 | 31 | 4095 |

In summary, a control system 1 for a feedback controlled LED driving circuit of the present invention has the component architecture as the aforementioned embodiments describe, and a control system 1 for a feedback controlled LED driving circuit of the present invention can only derive the electric energy of supply mains or alternating current of which full band waveform is lower than valley voltage threshold value, not the electric energy of full band waveform of each voltage fluctuation value. Therefore, a control system 1 for a feedback controlled LED driving circuit of the present invention can be served as low consumption and can efficiently control or drive system, and thus it can avoid unnecessary electric energy consumption and can further be used as synchronous signal for digitizing power factor. If only a valley detect regulator unit is used to make a fast start, the means of self-powered of conventional secondary side of a transformer or inductor can also be applicable to a control system 1 for a feedback controlled LED driving circuit of the present invention which can further promote the efficiency without influencing the generation of the synchronous signal which is used to digitize the power factor.

While the means of specific embodiments in present invention has been described by reference drawings, numerous modifications and variations could be made thereto by those skilled in the art without departing from the scope and spirit of the invention set forth in the claims. The modifications and variations should in a range limited by the specification of the present invention.

What is claimed is:

1. A control system for a feedback controlled LED driving circuit, the feedback controlled LED driving circuit being powered by a full-wave rectification unit rectifying an AC power signal to a sine-like DC power signal, the control system comprising:

a valley detecting regulator unit electrically connected to the rectification unit, the valley detecting regulator unit receiving and analyzing the sine-like DC power signal;

a power storage capacitor electrically connected to the valley detecting regulator, the power storage capacitor being charged by the valley detecting regulator unit with the sine-like DC power signal while the valley detecting regulator unit determines the voltage level of the sine-like DC power signal to be lower than a preset valley voltage;

a system power supply unit electrically connected to the power storage capacitor, the system power supply unit receiving electric energy from the power storage capacitor and converting the electric energy into system required voltages for the control system; and a control and feedback unit electrically connected to the feedback controlled LED driving circuit, the control and feedback unit receiving a feedback signal from the feedback controlled LED driving circuit and accordingly generating a control signal to control an output current of the feedback controlled LED driving circuit for driving an LED element or to provide a protective measure thereto;

wherein the control and feedback unit also connects to the valley detect regulator unit and receives a valley synchronous signal from the valley detect regulator unit, the valley synchronous signal generates in every valley of the sine-like DC power signal and starts a digital waveform for power factor correction, the control and feedback unit controls the output current of the feedback controlled LED driving circuit depending on the digital waveform.

2. The control system of claim 1, wherein the feedback controlled LED driving circuit comprises an anti-creep unit disposed in a power switch, the anti-creep unit directs a leakage current occurred in an indicator of the power switch to a dummy load to avoid the leakage current causing false start of the feedback controlled LED driving circuit.

3. The control system of claim 1, further comprising a digital numerical table connecting to the control and feedback unit, the digital numerical table recording a plurality of optimal power factor values and the plurality of optimal power factor values being output one by one when the control and feedback unit being triggered by the valley synchronous signal.

4. The control system of claim 3, further comprising a dynamic reference voltage generating unit electrically connected between the control and feedback unit and the digital numerical table, and the dynamic reference voltage generating unit converting the optimal power factor value to generate a constantly varying voltage signal through digital-to-analog conversion (DAC) so as to control the output current of the feedback controlled LED driving circuit.

* * * * *